(12) United States Patent
Nakayama et al.

(10) Patent No.: US 10,899,393 B2
(45) Date of Patent: Jan. 26, 2021

(54) REAR BODY STRUCTURE

(71) Applicant: HONDA MOTOR CO., LTD., Tokyo (JP)

(72) Inventors: Manabu Nakayama, Wako (JP); Yukihiro Ohki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 15/919,919

(22) Filed: Mar. 13, 2018

(65) Prior Publication Data
US 2018/0265138 A1  Sep. 20, 2018

(30) Foreign Application Priority Data

Mar. 14, 2017 (JP) ................................. 2017-047951
Mar. 14, 2017 (JP) ................................. 2017-048220
Mar. 14, 2017 (JP) ................................. 2017-048403

(51) Int. Cl.
| B62D 25/04 | (2006.01) |
| B62D 25/06 | (2006.01) |
| B62D 25/02 | (2006.01) |
| B62D 27/02 | (2006.01) |
| B60R 22/24 | (2006.01) |

(52) U.S. Cl.
CPC .............. B62D 25/04 (2013.01); B62D 25/02 (2013.01); B62D 25/06 (2013.01); B62D 27/023 (2013.01); B60R 22/24 (2013.01)

(58) Field of Classification Search
CPC ................................ B62D 25/04; B62D 25/02
See application file for complete search history.

(56) References Cited

U.S. PATENT DOCUMENTS

| 7,121,615 B2 * | 10/2006 | Hoshino | B62D 25/04 |
| | | | 296/203.03 |
| 7,293,823 B2 * | 11/2007 | Chen | B62D 25/06 |
| | | | 296/193.06 |
| 8,720,985 B2 * | 5/2014 | Izumi | B62D 25/025 |
| | | | 296/187.12 |

(Continued)

FOREIGN PATENT DOCUMENTS

| JP | H06-3776 U | 1/1994 |
| JP | 2012-162216 A | 8/2012 |

(Continued)

OTHER PUBLICATIONS

Office Action dated Aug. 28, 2018 in the corresponding Japanese patent application 2017-047951.

(Continued)

*Primary Examiner* — Nicole T Verley
(74) *Attorney, Agent, or Firm* — Carrier Blackman & Associates, P.C.; Joseph P. Carrier; William D. Blackman

(57) ABSTRACT

A rear body structure is provided that forms a design face of a rear pillar nicely and gives sufficient rigidity to the rear pillar. The rear body structure has a rear pillar at a rear of a vehicle body. The rear pillar includes an outer rear pillar that is arranged on an outside in a lateral direction to form an exterior face of the rear pillar, and an inner rear pillar that is arranged inside in the lateral direction of the outer rear pillar. The inner rear pillar has a protrusion that protrudes toward the outer rear pillar. The protrusion is formed continuously in a vertical direction of the rear pillar.

8 Claims, 12 Drawing Sheets

(56) References Cited

U.S. PATENT DOCUMENTS

| | | | | |
|---|---|---|---|---|
| 8,998,263 B1* | 4/2015 | Yustick | ................ | B62D 25/025 |
| | | | | 280/807 |
| 9,090,291 B1* | 7/2015 | Kanagai | ................ | B62D 25/025 |
| 9,580,109 B2* | 2/2017 | Mildner | ................ | B62D 21/152 |
| 9,821,853 B2* | 11/2017 | Torikawa | ............. | B62D 25/025 |
| 9,908,561 B2* | 3/2018 | Nishimura | ........... | B62D 25/087 |
| 9,988,087 B2* | 6/2018 | Yamamoto | ........... | B62D 25/025 |
| 10,189,505 B2* | 1/2019 | Narahara | ............. | B62D 25/025 |
| 10,526,020 B2* | 1/2020 | Narahara | ............. | B62D 25/025 |
| 2006/0208537 A1* | 9/2006 | Dingman | ................ | B62D 25/04 |
| | | | | 296/193.05 |
| 2012/0119477 A1 | 5/2012 | Kim | | |
| 2016/0039466 A1* | 2/2016 | Yamamoto | ............. | B62D 25/04 |
| | | | | 296/193.06 |
| 2016/0221610 A1* | 8/2016 | Nishimura | ............. | B62D 25/02 |
| 2017/0050679 A1* | 2/2017 | Shirooka | ............... | B62D 27/023 |
| 2017/0088184 A1* | 3/2017 | Emura | ................. | B62D 21/157 |
| 2017/0313359 A1* | 11/2017 | Narahara | ............. | B62D 25/025 |
| 2018/0244319 A1* | 8/2018 | Kiyoshita | ............... | B62D 25/04 |

FOREIGN PATENT DOCUMENTS

| | | | | |
|---|---|---|---|---|
| JP | 2012-228948 A | | 11/2012 | |
| JP | 5212498 B2 * | | 6/2013 | |
| JP | 2014-169046 A | | 9/2014 | |
| JP | 2016094060 A | | 5/2016 | |
| JP | 2017197060 A * | | 11/2017 | |
| JP | 2018149928 A * | | 9/2018 | |
| JP | 6435300 B2 * | | 12/2018 | |
| WO | WO-2010073303 A1 * | 7/2010 | ............. | B62D 25/04 |
| WO | WO-2012121142 A1 * | 9/2012 | ........... | B62D 25/087 |
| WO | WO-2013099456 A1 * | 7/2013 | ............. | B60R 13/06 |
| WO | WO-2014181739 A1 * | 11/2014 | ............. | B62D 25/06 |
| WO | 2015/190034 A1 | 12/2015 | | |

OTHER PUBLICATIONS

Office Action dated Aug. 28, 2018 in the corresponding Japanese patent application 2017-048220.

Office Action dated Aug. 28, 2018 in the corresponding Japanese patent application 2017-048403.

* cited by examiner

REAR BODY STRUCTURE

CROSS-REFERENCE TO RELATED APPLICATION

This application claims the benefit of priority to Japanese Patent Application Nos. 2017-47951, 2017-48403 and 2017-48220 filed on Mar. 14, 2017, the disclosures of all of which are hereby incorporated by reference in their entireties.

FIELD OF THE INVENTION

The present invention relates to a rear body structure having rear pillars.

DESCRIPTION OF THE RELATED ART

A conventional rear pillar of a car is known to have an outer member arranged outside a vehicle and an inner member arranged inside the vehicle so as to be joined to each other to form hollow portions having a closed cross section (see Japanese Patent Application Publication No. 2014-169046, for example). In a rear body structure having such a rear pillar, a reinforcing member, for example, in a U-shape may be attached, such as by spot-welding, on an inner side face of the outer member, to increase face rigidity of the outer members. Further, in a rear body structure having such a rear pillar, an anchor patch may be arranged on the rear pillar.

Still further, a conventional structure is known to have a reinforcing member in closed cross sections at a corner of a back door opening of the vehicle body (see Japanese Patent Application Publication No. 2012-228948, for example).

SUMMARY OF THE INVENTION

However, in the conventional rear body structure (see Japanese Patent Application Publication No. 2014-169046, for example), the outer member of the rear pillar directly forms a design face of the car in many cases. Therefore, mounting marks of the reinforcing member on the inner face of the outer member may affect the outer side face of the outer member to make the design face look bad.

Further, in the rear body structure, the anchor patch is welded in a vehicle width (lateral) direction with respect to the rear pillar. Therefore, the joining portion of the anchor patch receives a load in a releasing direction with respect to the pulling load of a seat belt. Therefore, a rear body structure is desired to have superior strength of joining the anchor patch to the rear pillar.

Still further, in the conventional rear body structure (see Japanese Patent Application Publication No. 2012-228948, for example), work holes are needed for a welding gun to spot-weld in the closed cross section, in addition to an increase of the number of parts. Therefore, a decrease in strength due to the work holes has to be compensated.

The present invention is intended to provide a rear body structure that makes a design face of a rear pillar look nice and gives sufficient rigidity of the rear pillar. In addition, the present invention is intended to provide a rear body structure that has more superior joining strength of an anchor patch with respect to the rear pillar than the conventional structure. Further, the present invention is intended to provide a rear body structure that improves strength at a corner of the rear pillar with a simple structure.

A rear body structure of the present invention to solve above problems has a rear pillar at a rear of a vehicle body, wherein the rear pillar includes an outer rear pillar that is arranged outside in a lateral direction to form an exterior face of the rear pillar and an inner rear pillar that is arranged inside of the outer rear pillar in the lateral direction, wherein the inner rear pillar has a protrusion that protrudes toward the outer rear pillar and the protrusion is continuously formed in a vertical direction of the rear pillar so as to have a contact portion that contacts an inner face of the outer rear pillar in the vertical direction of the rear pillar.

In addition, a rear body structure of the present invention has: an outer rear pillar that extends in a vertical direction to constitute a side face of a vehicle body; and an inner rear pillar that extends in the vertical direction to face the outer rear pillar; wherein the inner rear pillar has a protrusion that continuously protrudes toward the outer rear pillar in the vertical direction, an upper end of the inner rear pillar is curved inward in a lateral direction so as to form a corner, and the protrusion is joined in the corner to a roof member that constitutes a ceiling of the vehicle body or a rear member that constitutes a rear face of the vehicle body.

Further, a rear body structure of the present invention has a rear pillar at a rear of a vehicle body, wherein the rear pillar has an outer rear pillar that is arranged outside in a lateral direction, an inner rear pillar that is arranged inside of the outer rear pillar in the lateral direction, and an anchor patch of a seat belt that is arranged inside of the inner rear pillar in the lateral direction, wherein the inner rear pillar has a protrusion that protrudes toward the outer rear pillar and has a wall that extends in the lateral direction, and the anchor patch is joined to the wall in a longitudinal direction.

According to the present invention, the design face of the rear pillar looks nice and the rear pillar has sufficient rigidity. In addition, according to the present invention, the corner of the rear pillar has improved rigidity with a simple structure. Further, according to the present invention, the rear body structure has superior joining strength of the anchor patch with respect to the rear pillar to a conventional structure.

DETAILED DESCRIPTION OF THE PREFERRED EMBODIMENTS

Figure 1:
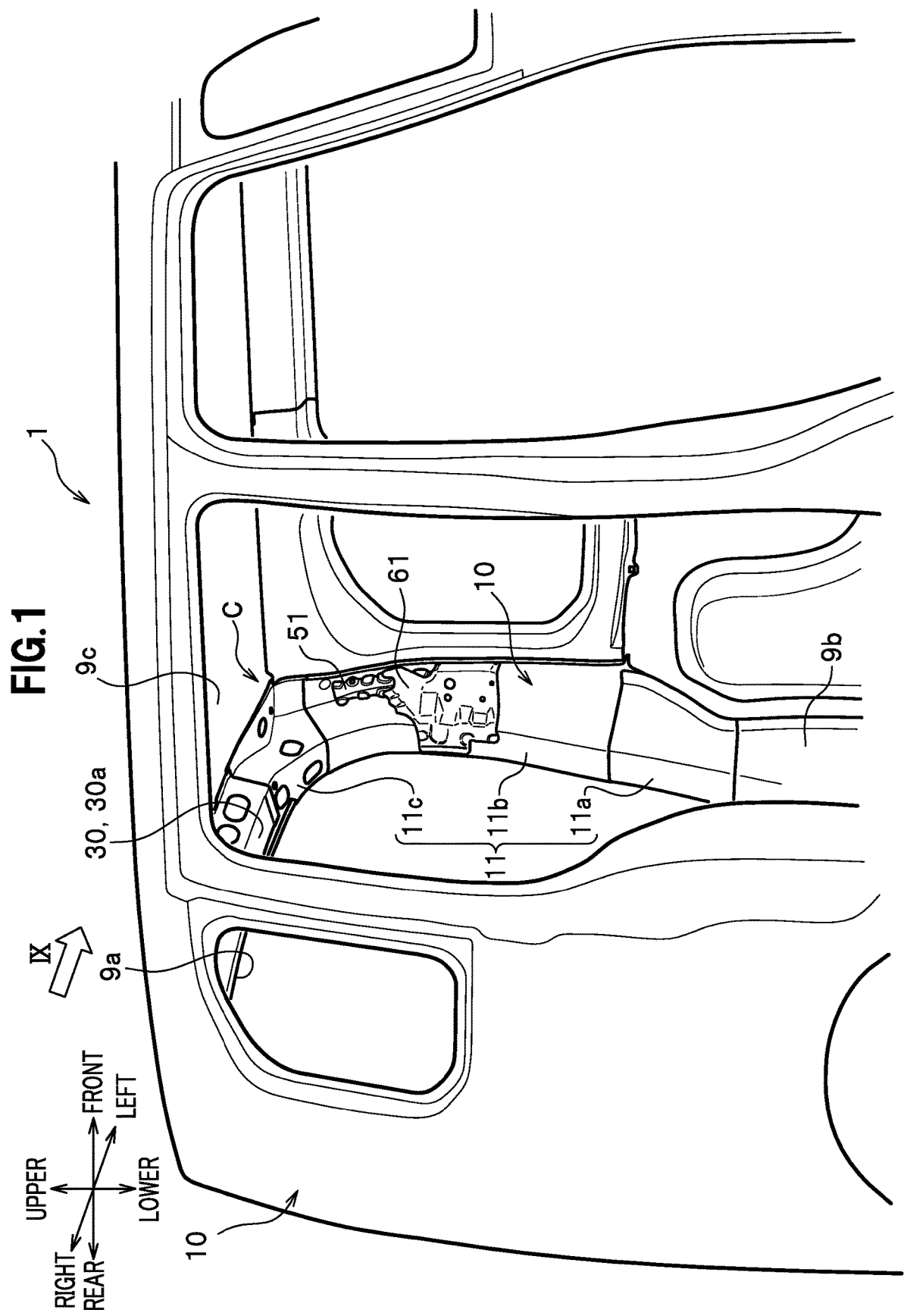
FIG. 1 is a perspective view of a rear body structure of the present invention.

Next, an embodiment (present embodiment) of the present invention will be described in detail. A rear body structure in the present embodiment is provided with rear pillars at the rear of a vehicle. In the following description of the rear body structure, the longitudinal, lateral and vertical directions are as viewed from a driver sitting in the vehicle, and the directions shown in FIG. 1 are used throughout all the drawings. FIG. 1 is a perspective view of a rear body structure 1 according to the present embodiment. Specifically, FIG. 1 is a perspective view of the rear body structure 1 having a rear pillar 10, as viewed diagonally from the front at the right side of the vehicle toward the interior of the vehicle through an opening of a rear door at the right side. Note that, in the drawings referred to in the following description, a door attached to the vehicle and a garnish attached inside the vehicle are not shown for the purpose of illustration.

As shown in FIG. 1, the rear body structure 1 according to the present embodiment has a pair of rear pillars 10 that is respectively arranged on both the right and left sides of a tailgate 9a. The lower end of each rear pillar 10 is connected to a rear end panel 9b joined to a rear wheel inner house (not shown). The upper end of each rear pillar 10 is connected to a roof 9c.

The pair of pillars 10 as described above has a symmetrical structure along the longitudinal direction at the center of the vehicle. Therefore, in the following description, only the rear pillar 10 on the left side will be described, and the rear pillar 10 on the right side will be omitted.

In FIG. 1, a reference numeral 11 denotes an inner rear pillar including a lower inner rear pillar 11a, a middle inner rear pillar 11b and an upper inner rear pillar 11c. A reference numeral C denotes a corner in which the upper inner rear pillar 11c curves inward in the lateral direction at the upper end of the inner rear pillar 11. A reference numeral 30a denotes an inner rear roof rail constituting a rear roof rail 30. A reference numeral 51 denotes a reinforcing member and a reference numeral 61 denotes an anchor patch.

The inner rear pillar 11, the reinforcing member 51, the inner rear roof rail 30a and the anchor patch 61 will be described in detail later.

Figure 2:
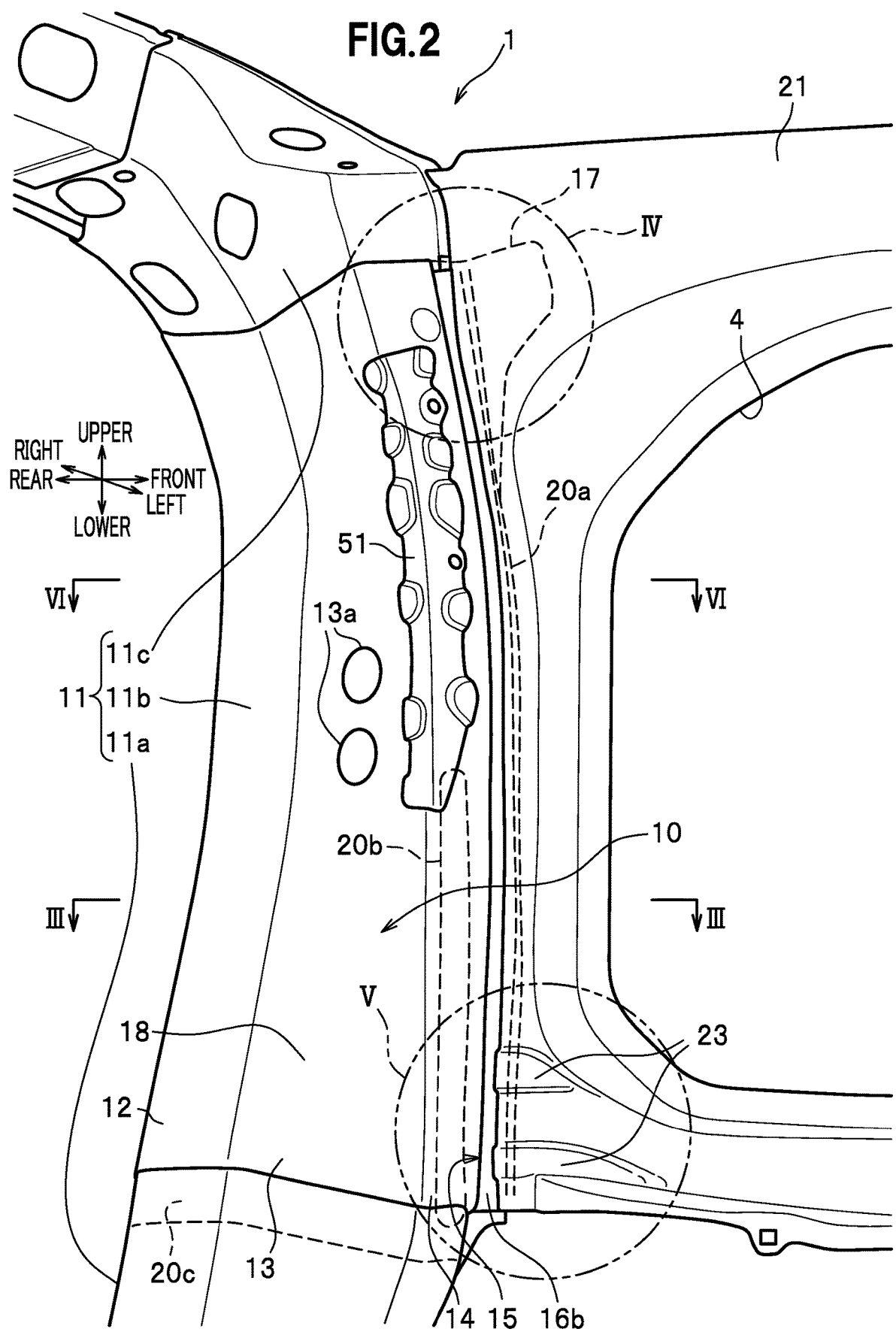
FIG. 2 is a partially enlarged view of a rear pillar shown in FIG. 1 without an anchor patch.
Figure 3:
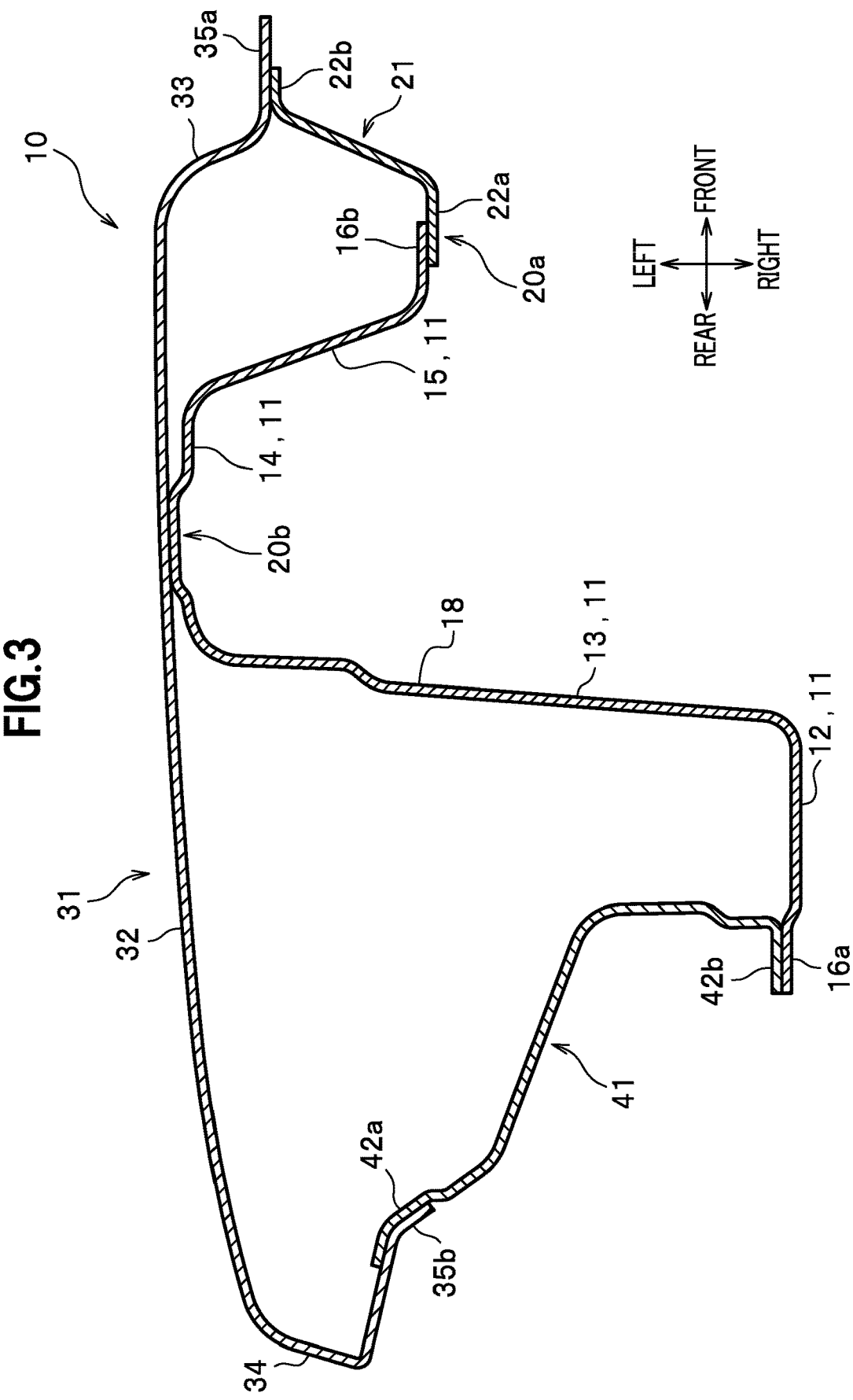
FIG. 3 is a cross-sectional view taken along a line III-III in FIG. 2.

FIG. 2 is a partially enlarged view of the rear pillar 10 shown in FIG. 1 without the anchor patch 61. FIG. 3 is a cross-sectional view taken along a line III-III in FIG. 2.

As shown in FIG. 2, the rear pillar 10 has the inner rear pillar 11 and an inner rear panel 21 that are respectively formed with curved plates inside the vehicle (near side in FIG. 2). In addition, as shown in FIG. 3, the rear pillar 10 has an outer rear pillar 31 and an outer rear panel 41 that are respectively formed with curved plates. Further, as shown in FIG. 1, the rear pillar 10 has the reinforcing member 51 and the anchor patch 61 of a seat belt (not shown).

<Inner Rear Pillar>

As shown in FIG. 2, the inner rear pillar 11 is divided into three parts, that is, a lower inner rear pillar 11a, a middle inner rear pillar 11b and an upper inner rear pillar 11c, to be arranged in this order from the lower side upward. The three parts are overlapped with each other with a given overlap margin.

Note that, in the present embodiment, both the lower inner rear pillar 11a and the middle inner rear pillar 11b may be regarded as a "lower inner rear pillar" that is arranged under the upper inner rear pillar 11c. In this case, the lower inner rear pillar 11a is defined as a first lower inner rear pillar and the middle inner rear pillar 11b is defined as a second lower inner rear pillar.

The lower inner rear pillar 11a forms the lower portion (portion lower than a window 4 formed on the side face of the vehicle) of the inner rear pillar 11.

The middle inner rear pillar 11b forms the middle portion (rear portion of the window 4 formed on the side face of the vehicle) of the inner rear pillar 11 in the vertical direction.

The middle inner rear pillar 11b forms the middle portion located inside of the inner rear pillar 11 in the longitudinal direction.

Note that the upper inner rear pillar 11c of the inner rear pillar 11 will be described in detail later along with the inner rear roof rail 30a.

In the following description, the lower inner rear pillar 11a, inner rear pillar 11b and upper inner rear pillar 11c are simply referred to as the "inner rear pillar 11" unless it is particularly necessary to distinguish them.

As shown in FIG. 3, the inner rear pillar 11, as viewed from above, has a rear inner wall 12 that extends in the longitudinal direction at the rear and an protruding rear wall 13 that bends at the front edge of the rear inner wall 12 to extend outward in the lateral direction (left as shown by the arrow in FIG. 3). In addition, the inner rear pillar 11 has a protruding inner wall 14 that bends at the the outer edge (left as shown by the arrow in FIG. 3) of the protruding rear wall 13 to extend forward in the longitudinal direction, and a protruding front wall 15 that bends at the front edge of the protruding inner wall 14 to extend inward in the lateral direction (right as shown by the arrow in FIG. 3), facing the protruding rear wall 13. Note that the length of the protruding front wall 15 in the lateral direction is shorter than that of the protruding rear wall 13 in the lateral direction. The length of the protruding front wall 15 in the present embodiment is set to be one third to one half of that of the protruding rear wall 13.

At the rear edge of the rear inner wall 12 of the inner rear pillar 11, a flange 16a is formed to be connected to a flange 42b of the outer rear panel 41 to be described later. Further, at the inner edge (right as shown by the arrow in FIG. 3) of the protruding front wall 15 of the inner rear pillar 11 has a front inner wall 16b to be connected to a flange 22a of the inner rear panel 21 to be described later.

The inner rear pillar 11 forms a protrusion 18 that protrudes outward in the lateral direction (left as shown by the arrow in FIG. 3) between the front edge of the rear inner wall 12 and the inner edge of the protruding front wall 15 in the longitudinal direction. The protrusion 18 is continuously formed in the vertical direction (orthogonal direction in FIG. 3) of the rear pillar 10. In other words, the protrusion 18 is continuously formed across the upper inner rear pillar 11c and the lower inner rear pillar 11a and the middle inner rear pillar 11b respectively defined as the first and second lower inner rear pillars.

The protrusion 18 increases the support rigidity of the rear pillar 10 against the push-up load from a rear wheel (not shown).

Note that the distance (gap) between the protruding rear wall 13 and the protruding front wall 15 facing each other to form the protrusion 18 in the present embodiment decreases from the inside (right shown by the arrow in FIG. 3) toward the outside (left shown by the arrow in FIG. 3) in the lateral direction. The protruding rear wall 13 and the protruding front wall 15 facing each other are preferably arranged so as to be oblique sides of an isosceles trapezoid having the protruding inner wall 14 as the upper base as viewed from above.

The front inner wall 16b of the inner rear pillar 11 is joined to the flange 22a of the inner rear panel 21 with each other at a joint portion 20a. The joint portion 20a extends vertically across the middle inner rear pillar 11b (see FIG. 2).

Note that, the front inner wall 16b of the inner rear pillar 11 in the present embodiment is overlapped with the outer face of the flange 22a of the inner rear panel 21 in the lateral direction.

As shown in FIG. 2, the middle inner rear pillar 11b has, at its upper end, an extension 17 formed by the middle inner rear pillar 11b extending toward the inner rear panel 21. In FIG. 2, the extension 17 is indicated by a hidden line (dotted line).

Figure 4:
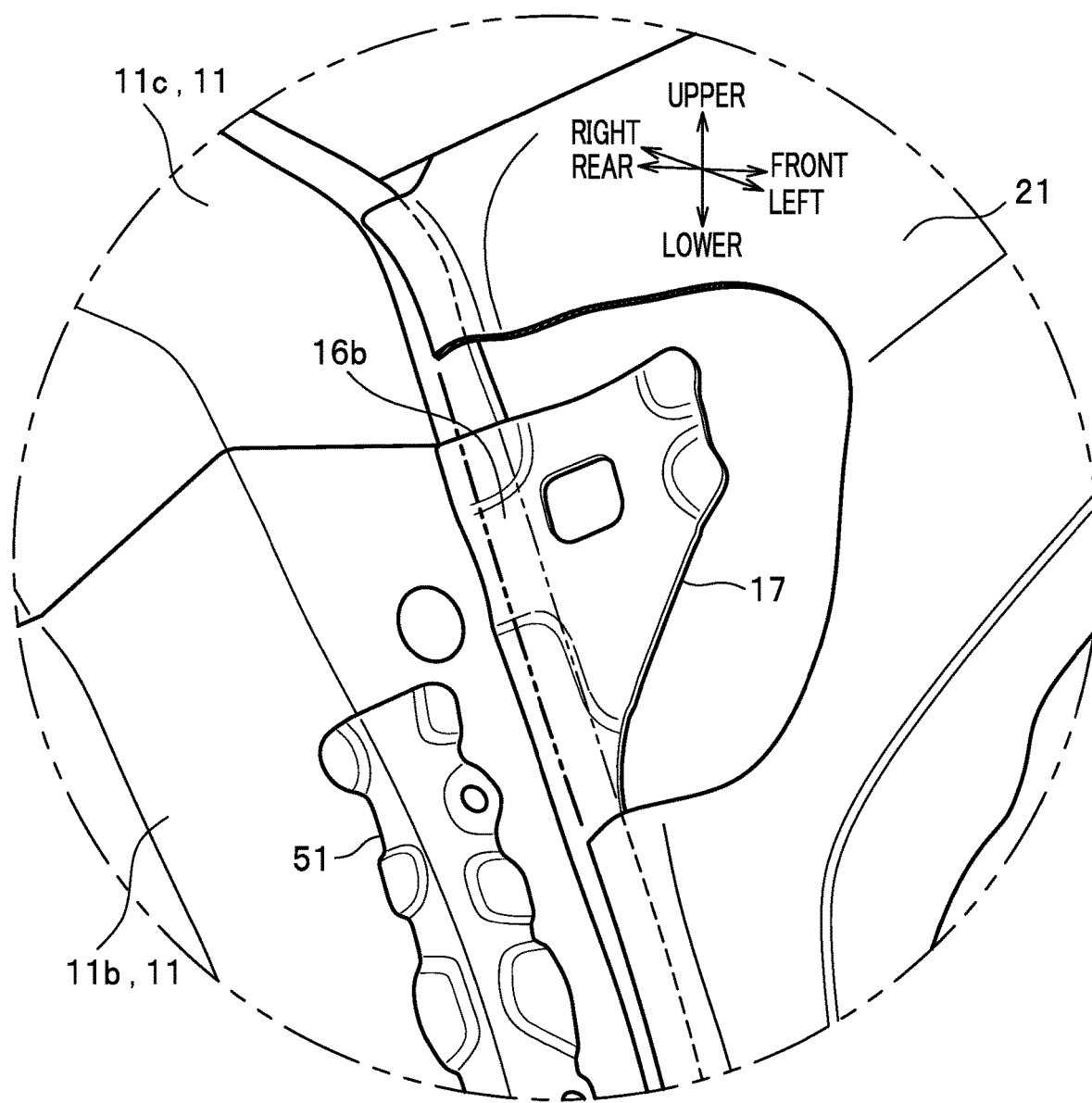
FIG. 4 is a partially enlarged view of an area IV shown in FIG. 2.

FIG. 4 is a partially enlarged view of an area IV in FIG. 2, including a fracture face of the inner rear panel 21 to show the extension 17 by cutting off a part of the inner rear panel 21.

As shown in FIG. 4, the extension 17 of the middle inner rear pillar 11b is formed, at the upper end thereof, to partially extend forward in the longitudinal direction from the front inner wall 16b. The planar shape of the extension 17 is a substantially right-angled trapezoid having a front side as an upper base and a bottom side as an oblique side.

The extension 17 is joined to the inner rear panel 21 by spot welding or the like. Further, the portion corresponding to the front inner wall 16b at the upper end of the middle inner rear pillar 11b is, of course, joined to the inner rear panel 21. That is, the upper end of the middle inner rear pillar 11b has a larger joint area to the inner rear panel 21 than the other part of the middle inner rear pillar 11b.

<Inner Rear Panel>

As shown in FIG. 3, the rear edge of the inner rear panel 21 is overlapped with the front edge of the inner rear pillar 11. The inner rear panel 21 forms a part of the front side of the rear pillar 10. As shown in FIG. 2, the inner rear panel 21 also forms a frame of the window 4 on the inside of the vehicle.

Returning to FIG. 3, the inner rear panel 21 has a plate facing the protruding front wall 15 of the inner rear pillar 11. Further, the flange 22a is formed at the inner edge (right as shown by the arrow in FIG. 3) of the inner rear panel 21. A flange 22b to be joined to a flange 35a of an outer rear pillar 31, which will be described below, is formed on the outer edge (left as shown by the arrow in FIG. 3) of the inner rear panel 21.

Note that the inner rear panel 21 and the protruding front wall 15 of the inner rear pillar 11 in the present embodiment are preferably arranged to form as oblique sides of an isosceles trapezoid having the overlapped portion between the front inner wall 16b and the flange 22a as an upper base, viewed from above.

As shown in FIG. 2, upper and lower beads 23 are formed at the lower end of the inner rear panel 21 on a side closer to the inner rear pillar 11.

Figure 5:
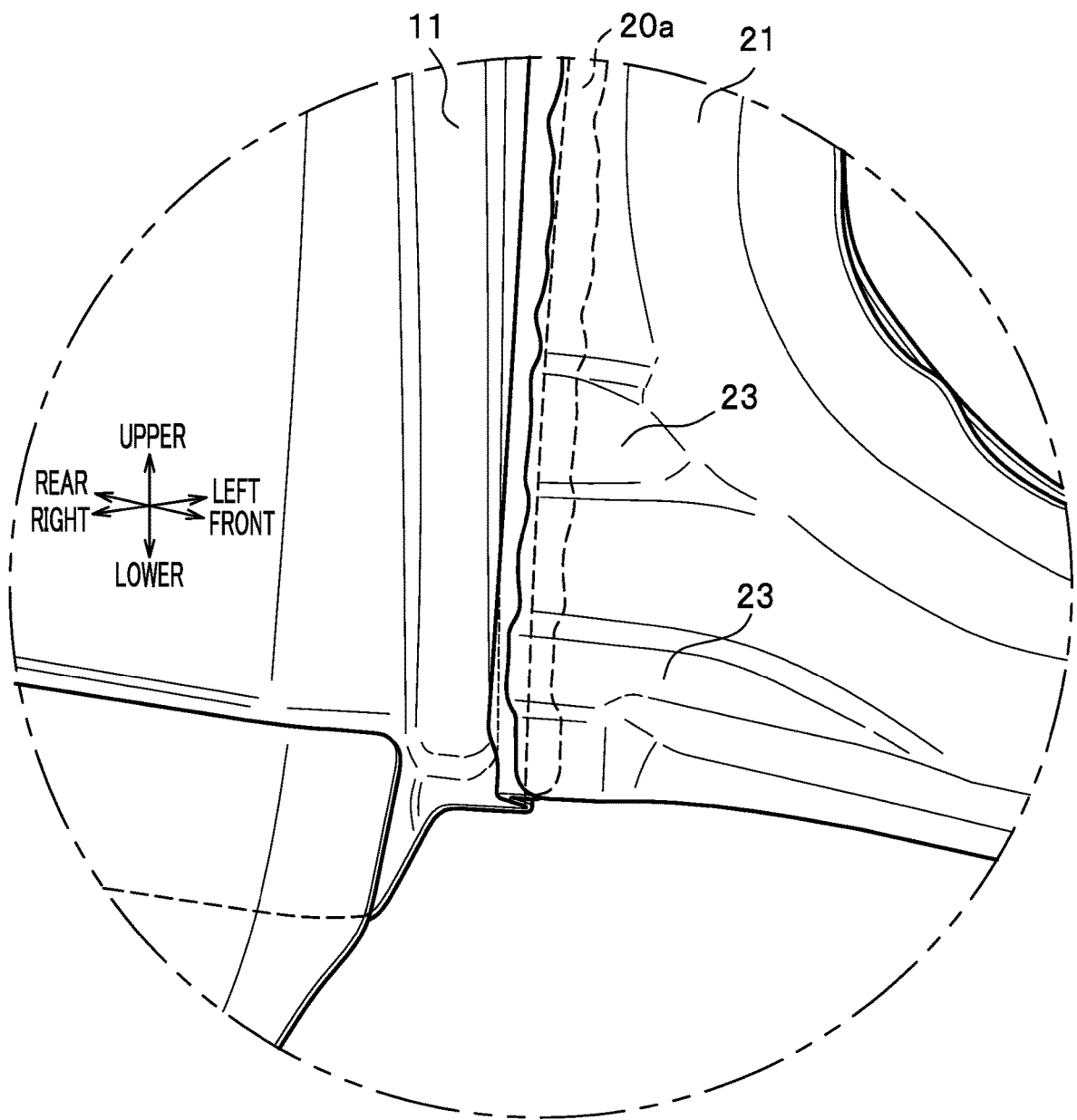
FIG. 5 is a partially enlarged view of an area V shown in FIG. 2.

FIG. 5 is a partially enlarged view of an area V in FIG. 2.

As shown in FIG. 5, the beads 23 extend forward in parallel with each other from the rear edge of the inner rear panel 21.

The upper bead 23 of the upper and lower beads 23 is shorter than the lower bead 23. The beads 23 are formed to be adjacent to the joint portion 20a between the inner rear pillar 11 and the inner rear panel 21. Note that, in the present embodiment, the base ends of the beads 23 at the rear edge of the inner rear panel 21 are formed to overlap the joint portion 20a.

That is, as shown in FIG. 2, the beads 23 of the inner rear panel 21 are connected to the extension 17 of the inner rear pillar 11 via the joint portion 20a. Further, the beads 23 are formed apart in the vertical direction of the rear pillar 10 from the extension 17.

<Outer Rear Pillar>

As shown in FIG. 3, the outer rear pillar 31 is arranged on the outer side in the lateral direction (left as shown by the arrow in FIG. 3) of the rear pillar 10. The outer rear pillar 31 forms a design face as viewed from the side of the vehicle.

The outer rear pillar 31 has a side wall 32 that substantially extends flatly, while slightly displacing inward in the lateral direction (right as shown by the arrow in FIG. 3) from the front toward the rear in the longitudinal direction.

The side wall 32 corresponds to a "side member" in the appended claims.

In addition, the outer rear pillar 31 has a front bent wall 33 that bends inward in the lateral direction at the front of the side wall 32 and extends toward the outer edge of the inner rear panel 21. Further, the outer rear pillar 31 has a rear bent wall 34 that bends inward in the lateral direction at the rear of the side wall 32 (right as shown by the arrow in FIG. 3) and then bends forward while extending straight, so as to extend toward the rear edge of the outer rear panel 41 to be described later. The flange 35a to be joined to the flange 22b of the inner rear panel 21 is formed at the front edge of the front bent wall 33. Furthermore, a flange 35b to be joined to a flange 42a of the outer rear panel 41 to be described later is formed at the front edge of the bending portion of the rear bent wall 34.

<Outer Rear Panel>

As shown in FIG. 3, the outer rear panel 41 is a plate that bends obliquely rearward toward the outside in the lateral direction while extending outward in the lateral direction (left as shown by the arrow in FIG. 3) from the rear edge of the rear inner wall 12 of the inner rear pillar 11. The flange 42b to be joined to the flange 16a of the inner rear pillar 11 is formed at the inner edge (right as shown by the arrow in FIG. 3) of the outer rear panel 41. The flange 42b is joined to the outer face in the lateral direction (left shown by the arrow in FIG. 3) of the flange 16a.

The flange 42a to be joined to the flange 35b of the outer rear pillar 31 is formed at the rear edge of the outer rear panel 41 as described above. The flange 42a is joined to the outer face in the lateral direction of the flange 35b.

The outer rear panel 41 in the present embodiment forms a substantially rear face of the rear pillar 10. The rear face is shaped to accommodate the outer face in the lateral direction of the hatchback door (not shown) mounted on the tailgate 9a (see FIG. 1).

<Closed Cross Section of Rear Pillar>

As shown in FIG. 3, the inner rear pillar 11, the inner rear panel 21, the outer rear pillar 31 and the outer rear panel 41 as described above form a hollow structure of the rear pillar 10 having a closed cross section.

Specifically, as shown in FIG. 3 including a cross section taken along the line III-III in FIG. 2, the protrusion 18 of the inner rear pillar 11 is in contact with and joined to the inner side face (inner face) in the lateral direction of the outer rear pillar 31 (side wall 32 as a side member). As a result, the rear pillar 10 has two closed cross sections arranged in line in the longitudinal direction.

Note that, when described using FIG. 2, the protrusion 18 in the present embodiment is formed to hollow outward in the lateral direction (rear face in FIG. 2) by the protruding rear wall 13, the protruding inner wall 14 and the protruding front wall 15 between the rear inner wall 12 and the front inner wall 16b.

As shown in FIG. 2, a contact portion 20b between the inner rear pillar 11 and the outer rear pillar 31 shown in FIG. 3 is formed in the vertical direction of the rear pillar 10. Note that, at the contact portion 20b, although not shown, the inner rear pillar 11 is joined to the outer rear pillar 31 (see FIG. 3) by a cross-linkable mastic sealer such as polysulfide, polyurethane and silicone.

More specifically, as shown in FIG. 2, the upper end of the contact portion 20b is formed to overlap with the lower end of the reinforcing member 51 to be described later. Note that the reinforcing member 51 is arranged inside in the lateral direction of the protruding inner wall 14, as will be described in detail later. That is, the contact portion 20b is arranged outside, and the reinforcing member 51 is arranged inside of the protruding inner wall 14. Thus, the upper end of the contact portion 20b is overlapped with the lower end of the reinforcing member 51 with each other. Accordingly, the reinforcing member 51 is continuous to the contact portion 20b in the vertical direction of the rear pillar 10.

Further, as shown in FIG. 2, the lower end of the contact portion 20b is formed in the vicinity of an overlapped portion 20c between the lower inner rear pillar 11a and the middle inner rear pillar 11b. Specifically, the lower end of the contact portion 20b in the present embodiment extends to the overlapped portion 20c between the lower inner rear pillar 11a and the middle inner rear pillar 11b.

<Reinforcing Member>

As shown in FIG. 2, the reinforcing member 51 is arranged to extend in the vertical direction in a recess formed inside in the lateral direction by the protrusion 18 of the inner rear pillar 11. Note that the recess is formed to be surrounded by the protruding rear wall 13, the protruding inner wall 14 and the protruding front wall 15.

In FIG. 2, a reference numeral 13a denotes holes formed in the protruding rear wall 13 of the inner rear pillar 11. The holes 13a are used as insertion holes for a working tool to join an anchor patch 61 (see FIG. 12) to be described later to the protruding front wall 15 of the inner rear pillar 11.

Figure 6:
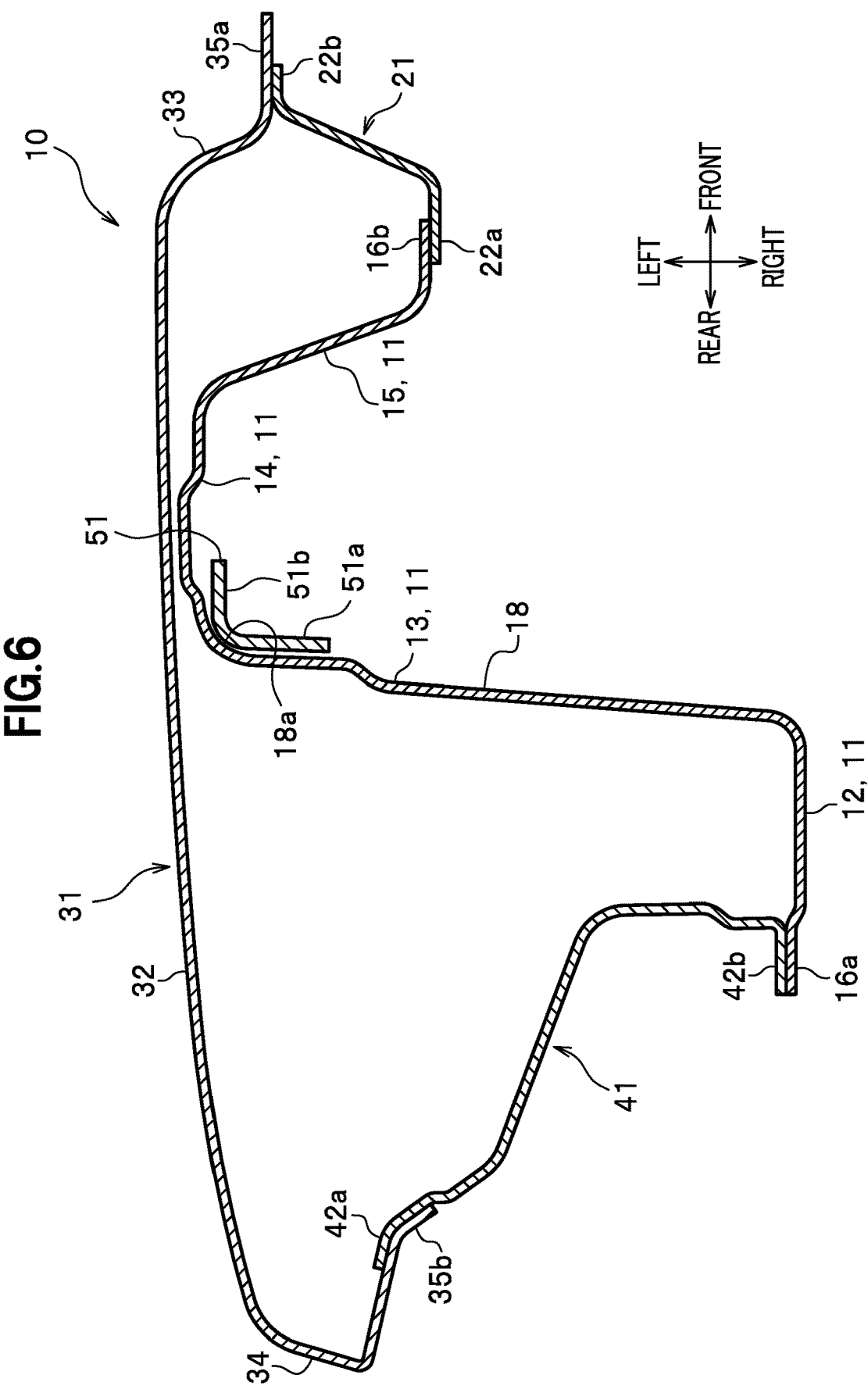
FIG. 6 is a cross-sectional view taken along a line VI-VI in FIG. 2.

FIG. 6 is a cross-sectional view taken along the line VI-VI in FIG. 2. Note that, in FIG. 6, the same components as those shown in FIG. 3 are denoted by the same reference numerals, and detailed descriptions thereof will be omitted.

As shown in FIG. 6, the reinforcing member 51 has a substantially L-shaped cross section.

The reinforcing member 51 is arranged in a corner portion 18a formed on the inner side in the lateral direction (right shown by the arrow in FIG. 6) by the protruding rear wall 13 and the protruding inner wall 14 of the inner rear pillar 11. The reinforcing member 51 is arranged along the corner portion 18a so as to extend in the vertical direction of the rear pillar 10 (orthogonal direction in FIG. 6).

Accordingly, the reinforcing member 51 includes a lateral wall 51a (front side face in the longitudinal direction) facing forward and a longitudinal wall 51b (inner side face in the lateral direction) facing inward. The reinforcing member 51 is joined to the protruding rear wall 13 and the protruding inner wall 14 of the inner rear pillar 11 by spot welding or the like.

<Upper Inner Rear Pillar and Inner Rear Roof Rail>

Figure 7:
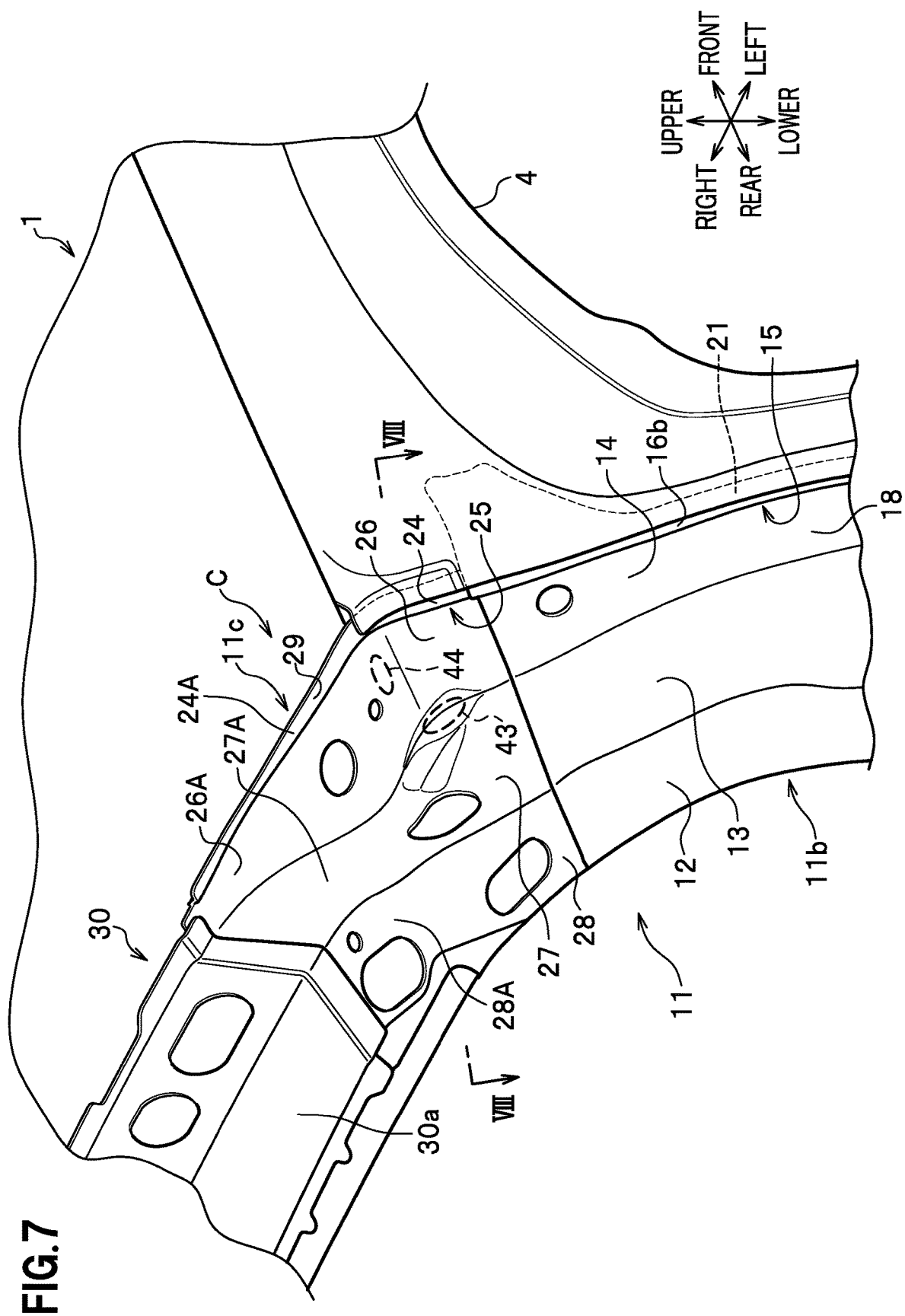
FIG. 7 is a partially enlarged perspective view around a corner shown in FIG. 1.
Figure 8:
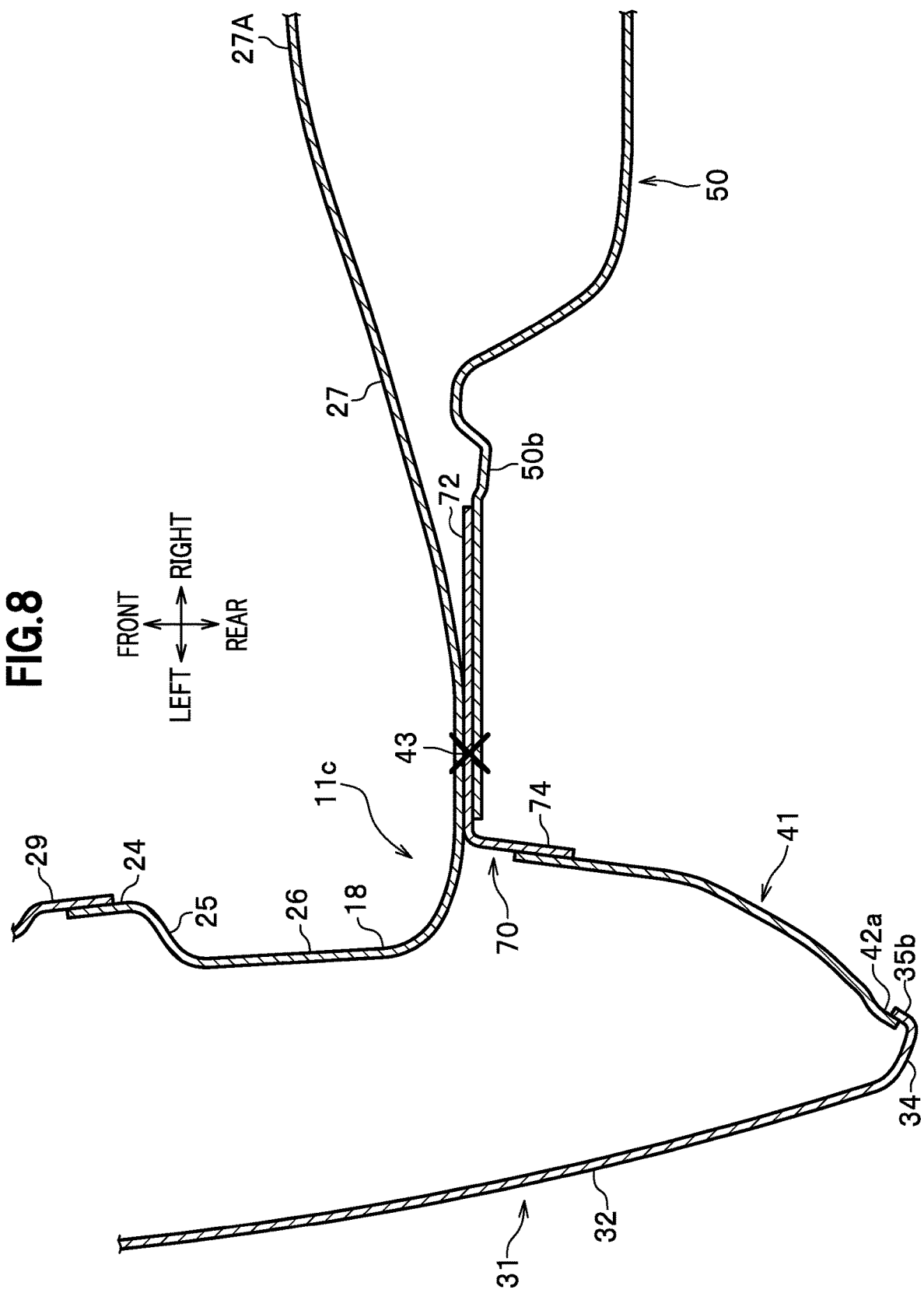
FIG. 8 is a cross-sectional view taken along a line VIII-VIII shown in FIG. 7.

FIG. 7 is a partially enlarged perspective view near the corner C in FIG. 1. FIG. 8 is a cross-sectional view taken along the line VIII-VIII in FIG. 7. Note that, in FIG. 8, the same components as those shown in FIG. 3 are denoted by the same reference numerals, and detailed descriptions thereof will be omitted.

As shown in FIG. 7, the upper inner rear pillar 11c constitutes the upper end of the inner rear pillar 11 and the outer end in the lateral direction of the rear roof rail 30. The upper inner rear pillar 11c is made of a curved plate.

In other words, the upper inner rear pillar 11c includes the corner C that is bent inward in the lateral direction at the upper end of the inner rear pillar 11.

As shown in FIGS. 7 and 8, the upper inner rear pillar 11c includes, as portions in one piece to constitute the upper end of the inner rear pillar 11, a front inner wall 24, a protruding front wall 25 that extends outward in the lateral direction from the rear end of the front inner wall 24, a protruding inner wall 26 that extends rearward from the outer end in the lateral direction of the protruding front wall 25, a protruding rear wall 27 that extends inward in the lateral direction from the rear end of the protruding inner wall 26, and a rear inner wall 28 that extends rearward in the lateral direction from the inner end of the protruding rear wall 27.

The front inner wall 24 is arranged to be continuous in the vertical direction to the front inner wall 16b of the middle inner rear pillar 11b. The lower end of the front inner wall 24 is joined to the upper end of the front inner wall 16b by welding or the like.

The protruding front wall 25 is arranged to be continuous in the vertical direction to the protruding front wall 15 of the middle inner rear pillar 11b. The lower end of the protruding front wall 25 is joined to the upper end of the protruding front wall 15 by welding or the like.

The protruding inner wall 26 is arranged to be continuous in the vertical direction to the protruding inner wall 14 of the middle inner rear pillar 11b. The lower end of the protruding inner wall 26 is joined to the upper end of the protruding inner wall 14 by welding or the like.

The protruding rear wall 27 is arranged to be continuous in the vertical direction to the protruding rear wall 13 of the middle inner rear pillar 11b.

The lower end of the protruding rear wall 27 is joined to the upper end of the protruding rear wall 13 by welding or the like.

The rear inner wall 28 is joined to the upper end of the rear inner wall 12 of the middle inner rear pillar 11b by welding or the like.

Figure 9:
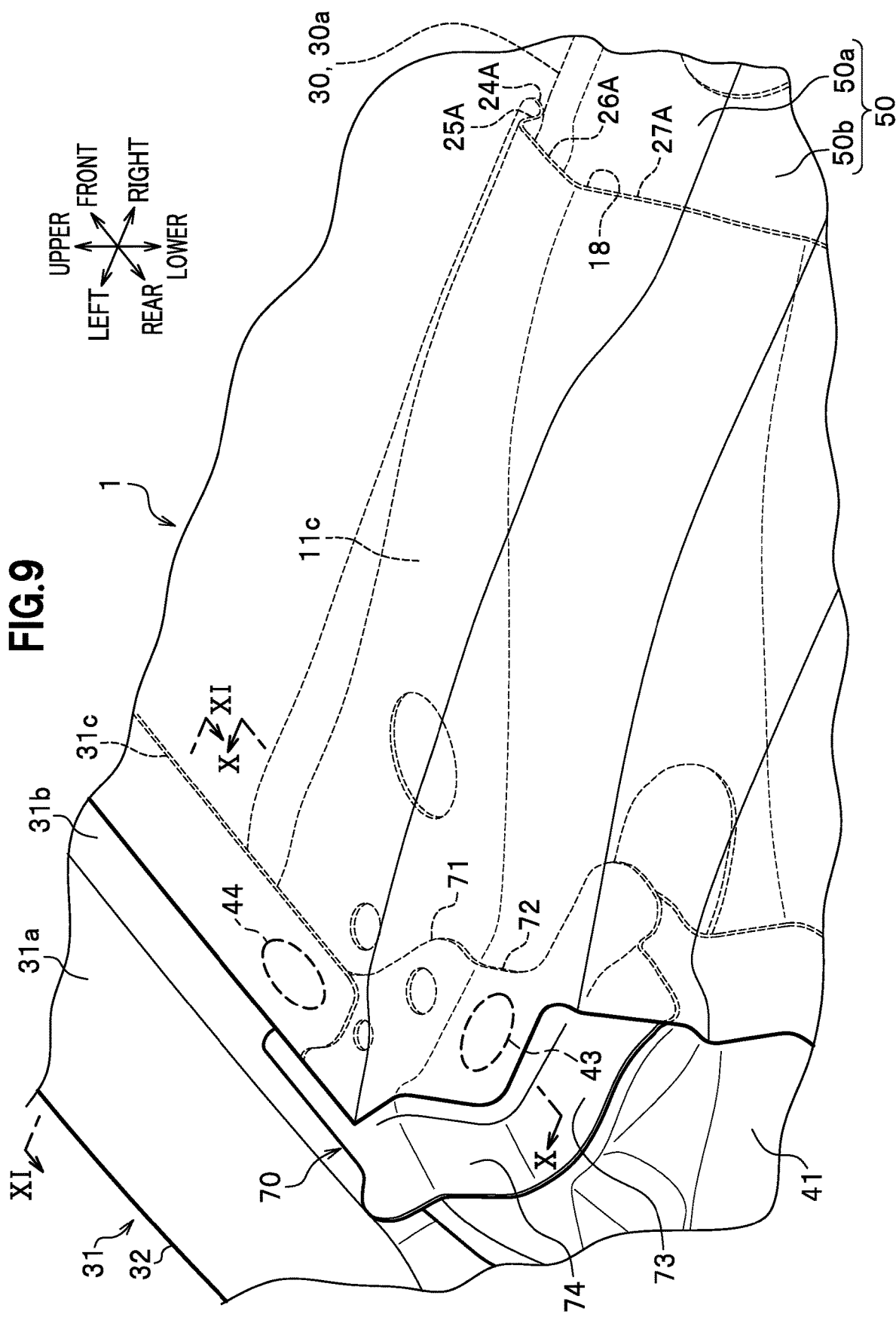
FIG. 9 is a partially enlarged view of the left upper portion of the rear body structure shown in FIG. 1, as viewed in an arrow direction IX in FIG. 1.

FIG. 9 is a partially enlarged perspective view of the rear upper at the left of the rear body structure 1 shown in FIG. 1, as viewed from a direction IX in FIG. 1. In other words, FIG. 9 shows an exterior of the rear body structure 1 as viewed from a point corresponding to the corner C in FIG. 7. Note that, in FIG. 9, the upper inner rear pillar 11c and the rear roof rail 30 are shown by hidden lines (dotted lines).

As shown in FIG. 9, the upper inner rear pillar 11c constitutes the outer end in the lateral direction (left end in FIG. 9) of the rear roof rail 30.

The upper inner rear pillar 11c includes, in one piece, a front inner wall 24A, a protruding front wall 25A (see FIG. 9) to be described later that extends upward from the rear end of the front inner wall 24A, a protruding inner wall 26A that extends rearward from the upper end of the protruding front wall 25A, a protruding rear wall 27A that extends downward from the rear end of the protruding inner wall 26A, and a rear inner wall 28A that extends rearward from the lower end of the protruding rear wall 27A.

As shown in FIG. 7, the front inner wall 24A extends inward in the lateral direction from the upper end of the front inner wall 24. The protruding front wall 25A extends inward in the lateral direction from the upper end of the protruding front wall 25. The protruding inner wall 26A extends inward in the lateral direction from the upper end of the protruding inner wall 26. The protruding rear wall 27A extends inward in the lateral direction from the upper end of the protruding rear wall 27. The rear inner wall 28A extends inward in the lateral direction from the upper end of the rear inner wall 28.

In addition, as shown in FIG. 8, the protruding walls 25-27 form the protrusion 18 that protrudes toward the outer rear pillar 31. The protruding inner wall 26 is separated inward in the lateral direction from the outer rear pillar 31.

Further, as shown in FIG. 9, the protruding walls 25A-27A form the protrusion 18 that protrudes toward an upper wall (outer roof panel body) 50a of an outer roof panel (roof member) 50 to be described later.

In other words, as shown in FIG. 7, the protrusion 18 extends along the outer roof panel 50 (see FIG. 9) to communicate with the rear roof rail 30 from the middle inner rear pillar 11b through the upper inner rear pillar 11c.

As shown in FIG. 7, an inner rear panel 29 similar to the inner rear panel 21 is arranged on the front side of the upper inner rear pillar 11c.

That is, as shown in FIG. 8, the upper inner rear pillar 11c defines a closed cross section in the horizontal direction along with the outer rear pillar 31, the inner rear panel 29 and the outer rear panel 41 at the upper end of the rear pillar 10 (see FIG. 1).

In addition, the upper inner rear pillar 11c (see FIG. 9) defines, though not shown, a closed cross section in a direction crossing the extending direction of the rear roof rail 30, together with the outer roof panel 50 (see FIG. 9), the inner rear panel 29 (see FIG. 8) and the outer rear panel 41 (see FIG. 9) at the end in the lateral direction of the rear roof rail 30 (see FIG. 9).

Further, the inner end in the lateral direction of the upper inner rear pillar 11c (see FIG. 8) is joined to the inner rear roof rail 30a (see FIG. 8) by welding or the like. The inner rear roof rail 30a is formed of a curved plate that extends in the lateral direction at the rear body. As shown in FIG. 9, the inner rear roof rail 30a constitutes the rear roof rail 30 along with the outer roof panel 50 and the outer rear panel 41. The inner rear roof rail 30a defines a closed cross section with the outer roof panel 50 and the outer rear panel 41.

<Outer Roof Panel>

As shown in FIG. 9, the outer roof panel 50 is one of the roof members constituting the ceiling of the vehicle and is formed of a curved plate. The outer roof panel 50 includes the upper wall 50a and a rear wall (extending portion) 50b that extends downward from the rear end of the upper wall 50a in one piece.

The upper wall 50a is a main body of the outer roof panel 50 constituting the upper face of the vehicle and corresponds to an "outer roof panel body" in the appended claims. The rear wall 50b extends downward from the rear end of the upper wall 50 and corresponds to an "extending portion" in the appended claims.

<Garter>

As shown in FIG. 9, a garter (rear member) 70 is one of the rear members constituting the rear face of the vehicle and connects the outer rear panel 41 to the outer roof panel 50. The garter 70 is formed of a curved plate.

The garter 70 includes an upper wall 71, a rear wall 72, and flanges 73, 74 in one piece.

The upper wall 71 is in an L-shape, in a planar view, having a bent portion at the front and outward in the lateral direction. The rear wall 72 extends downward from the rear end of the horizontal side of the upper wall 71. The flange 73 extends obliquely rearward and downward from the lower end of the rear wall 72. The flange 74 connects the inner end in the lateral direction of the front and rear sides of the upper wall 71 to the flange 73.

The rear wall 72 is joined to the lower end of the rear wall 50b in the outer roof panel 50 by welding or the like. The flange 73 is joined to the upper end of the rear wall 72 of the garter 70 by welding or the like. The flange 74 extends in the longitudinal direction and is joined to the rear wall 72 of the garter 70 by welding or the like.

Figure 10:
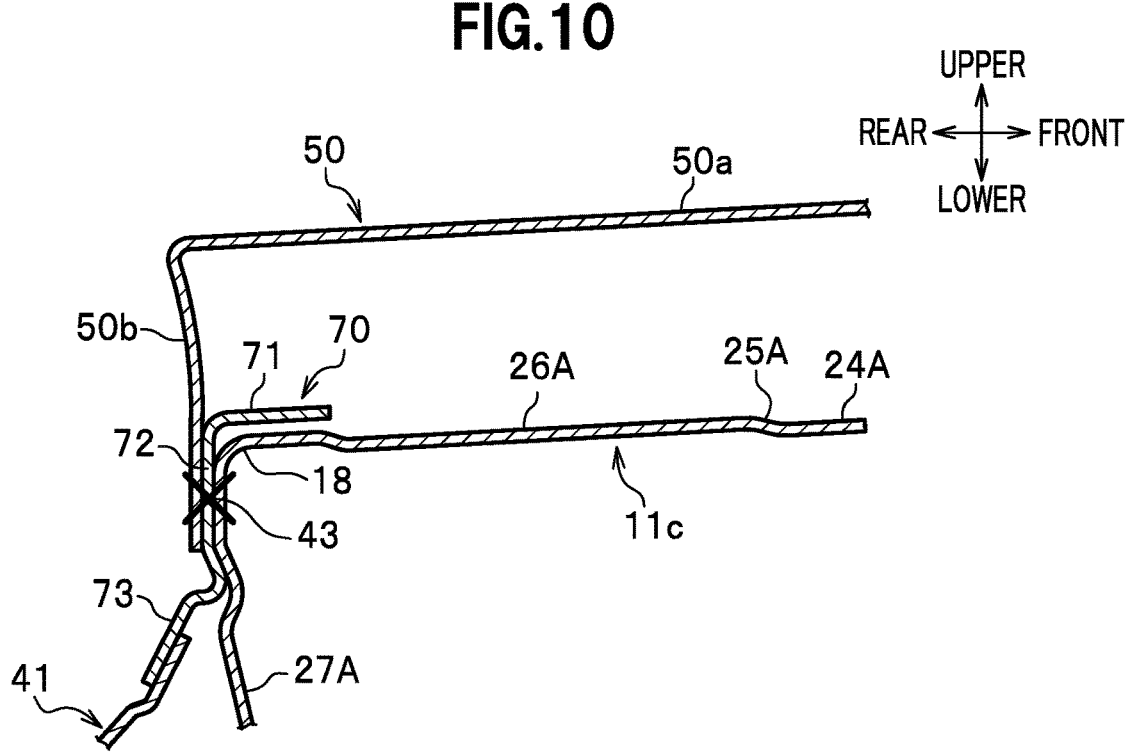
FIG. 10 is a cross-sectional view taken along a line X-X in FIG. 9.
Figure 11:
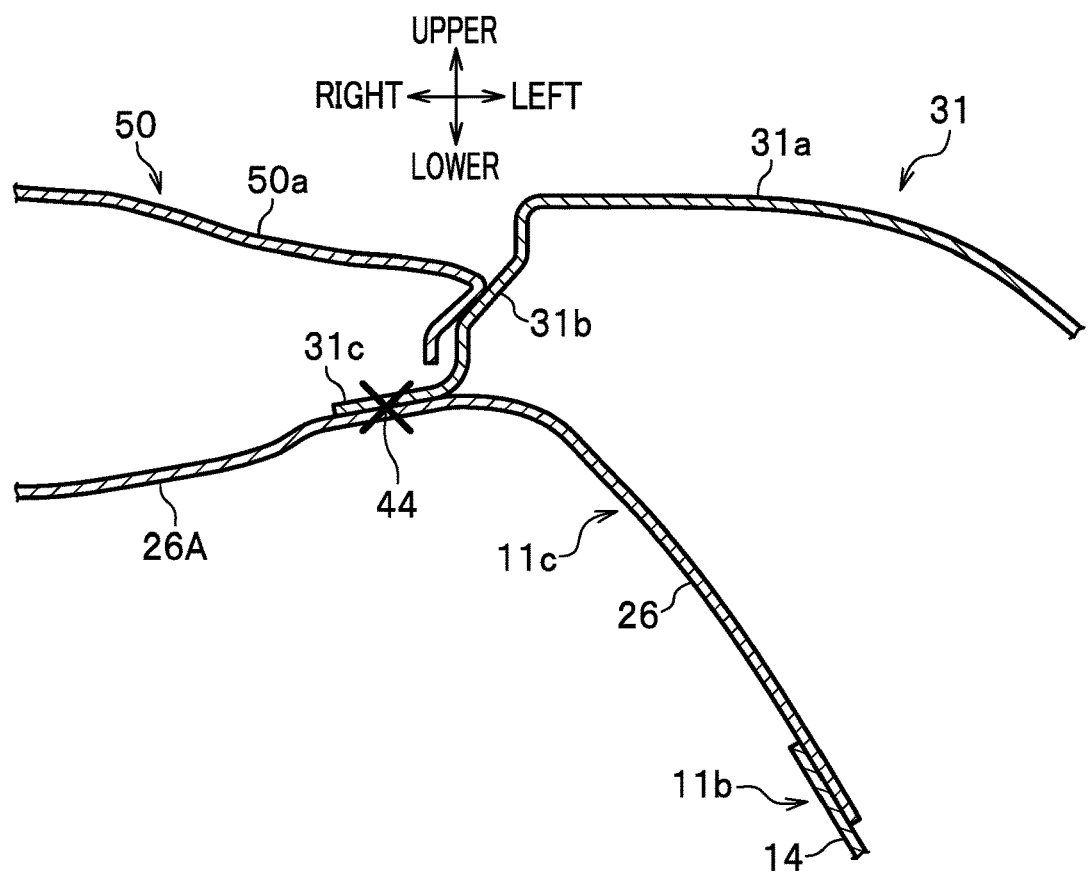
FIG. 11 is a cross-sectional view taken along a line XI-XI in FIG. 9.

FIG. 10 is a cross-sectional view taken along the line X-X in FIG. 9. FIG. 11 is a cross-sectional view taken along the line XI-XI in FIG. 9. Note that, in FIGS. 10 and 11, the same components as those shown in FIG. 9 are denoted by the same reference numerals, and detailed descriptions thereof will be omitted.

As shown in FIGS. 9 and 10, the upper end of the protruding rear wall 27A is joined to the rear wall 72 of the garter 70 overlapped on the rear side of the protruding rear wall 27A, and the rear wall 50b of the outer roof panel 50 by three-layer welding or the like. The joint portion is denoted by reference numeral 43 in FIG. 9.

In addition, as shown in FIG. 9, the protruding inner wall 26A is joined to the upper portion of the outer rear pillar 31.

The upper portion of the outer rear pillar 31 includes an upper wall (extending portion) 31a, an inner wall 31b (extending portion) and a lower wall (extending portion) 31c (shown by a hidden line (dotted line) in FIG. 9) extending inward in the lateral direction from the upper end of the side wall (side member) 32. The upper wall 31a, the inner wall 31b and the lower wall 31c corresponds to an "extending portion of the side member" in the appended claims.

As shown in FIGS. 9 and 11, the protruding inner wall 26A is joined to the lower wall 31c overlaid thereon by welding or the like. The joint portion is denoted by reference numeral 44 in FIG. 9.

The joint portions 43, 44 can be joined without holes for a welding gun in the upper inner rear pillar 11c or the like.

As described above, in the present embodiment, the protrusion 18 is joined to the outer roof panel 50 (roof member) and the garter 70 (rear member) at the same portion. Further, the protrusion 18 is joined to the lower wall 31c (extending portion) of the side wall 32 (side member).

<Anchor Patch>

Figure 12:
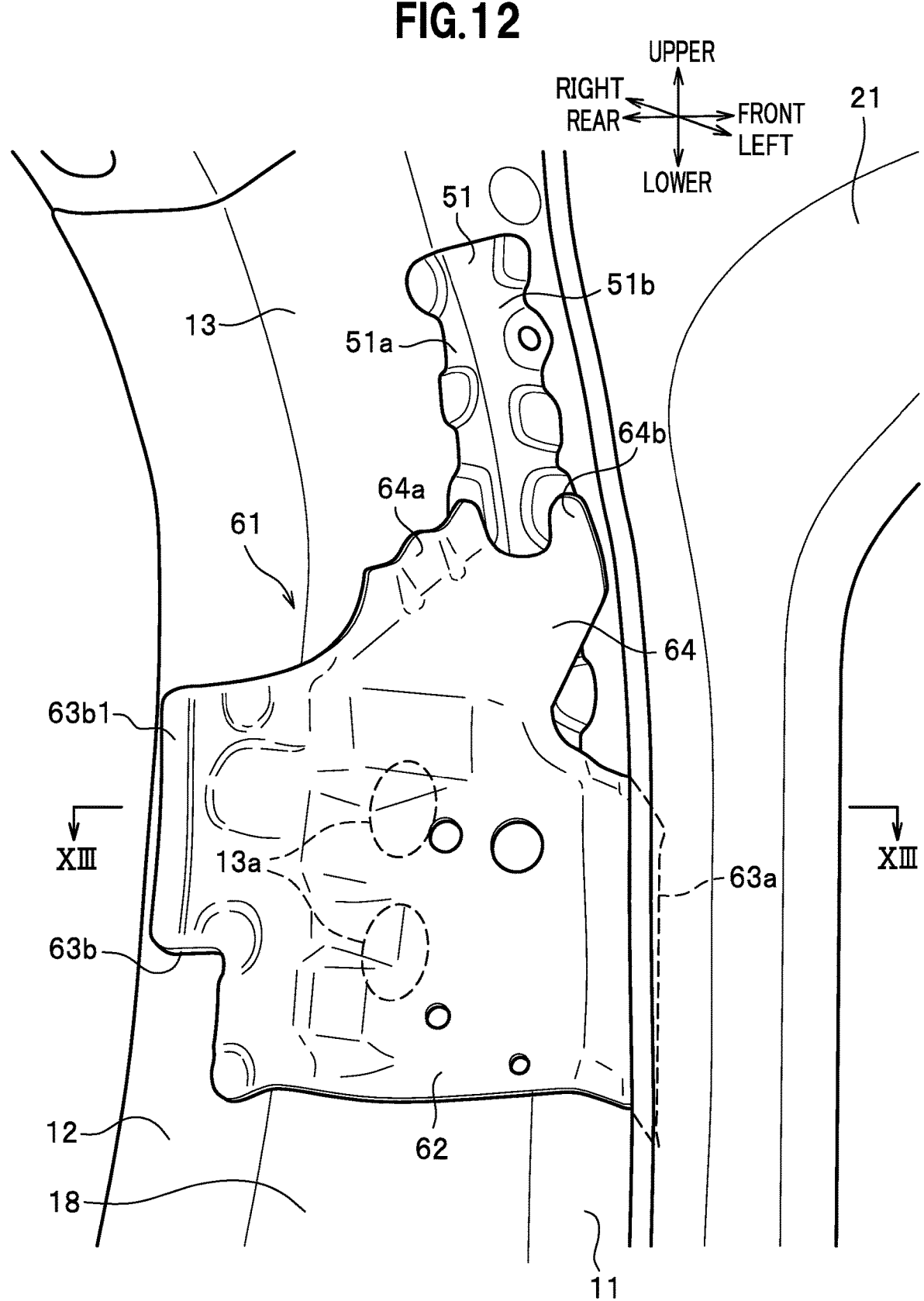
FIG. 12 is a partially enlarged view around the anchor patch shown in FIG. 1.
Figure 13:
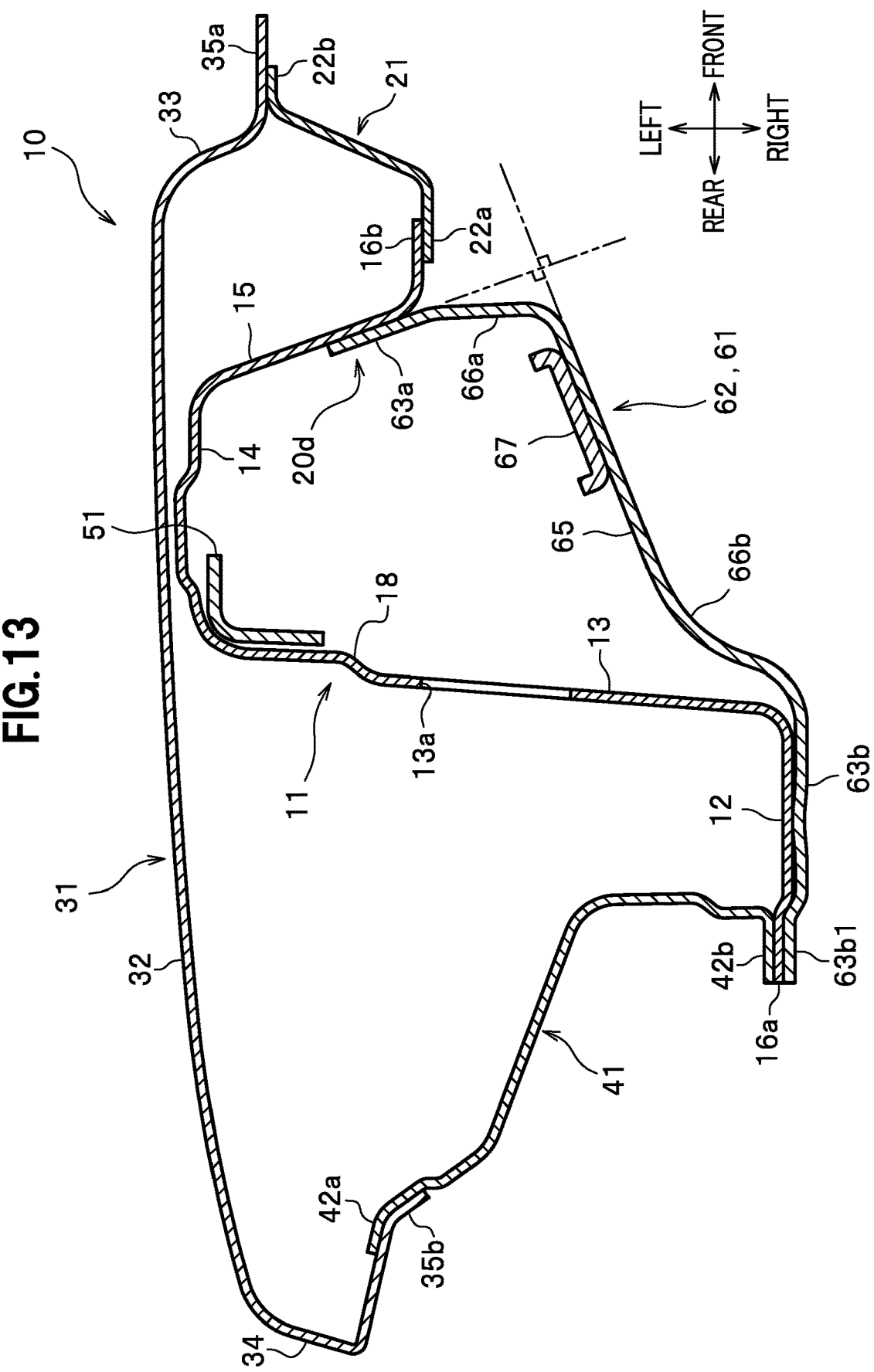
FIG. 13 is a cross-sectional view taken along a line XIII-XIII in FIG. 12.

FIG. 12 is a partially enlarged view around the anchor patch 61 in FIG. 1. FIG. 13 is a cross-sectional view taken along the line XIII-XIII in FIG. 12. Note that, in FIG. 13, the same components as those shown in FIG. 3 are denoted by the same reference numerals, and detailed descriptions thereof will be omitted As described above, the anchor patch 61 (see FIG. 1) is used for attaching an anchor, which supports a D-ring or the like to insert a seat belt (not shown), to the rear pillar 10 (see FIG. 1).

As shown in FIG. 12, the anchor patch 61 in the present embodiment is formed of a curved plate.

The anchor patch 61 includes a main body 62, a pair of flanges 63a and 63b for supporting the main body 62 on the inner rear pillar 11, and an extended portion (anchor patch extended portion) 64 extending from the main body 62. Note that, in FIG. 12, the flange 63a is indicated by a hidden line (dotted line).

As shown in FIG. 13, the main body 62 has a face arranged to cover, from inside in the lateral direction, the recess formed inside in the lateral direction so as to define the protrusion 18 of the inner rear pillar 11.

The main body 62 in the present embodiment includes an anchor attachment face 65 located in an imaginary plane substantially orthogonal to a direction in which the inner side face (rear face in the longitudinal direction) of the protruding front wall 15 of the inner rear pillar 11 extends, and joint faces 66a, 66b to join the anchor attachment face 65 to the flanges 63a, 63b, respectively. Note that an anchor 67 is attached by spot welding or the like to the outer face in the lateral direction (left as shown by the arrow in FIG. 13) of the anchor attachment face 65.

The joint face 66a is arranged between the flange 63a to be described next and the anchor attachment face 65, and the joint face 66b is arranged between the flange 63b to be described next and the anchor attachment face 65.

The flange 63a is arranged along the inner side face of the protruding front wall 15 of the inner rear pillar 11 so as to be joined to said inner side face by spot welding or the like.

The flange 63b is arranged along the inner side face in the lateral direction (right as shown by the arrow in FIG. 13) of the rear inner wall 12 of the inner rear pillar 11 so as to be joined to said inner side face by spot welding or the like.

As shown in FIG. 12, the extended portion 64 extends obliquely upward to the outside in the lateral direction from the main body 62. Specifically, the extended portion 64 extends toward the reinforcing member 51 in the recess formed inside in the lateral direction so as to define the protrusion 18 of the inner rear pillar 11.

A support plate 64a is formed, at the rear edge of the extended portion 64, which is curved so as to extend along the protruding rear wall 13 of the inner rear pillar 11. The support plate 64a extends to the lateral wall 51a (front side face in the longitudinal direction) forming an L-shape of the reinforcing member 51 along the rear edge of the extended portion 64.

The support plate 64a is joined to the protruding rear wall 13 of the inner rear pillar 11 and the lateral wall 51a of the reinforcing member 51 by spot welding (three-layer welding) or the like.

Further, the extended portion 64 has, at the end of the extended portion 64 extending toward the reinforcing member 51, a support section 64b that curves along the longitudinal wall 51b (inner side face in the lateral direction) of the reinforcing member 51 in an L-shape. The support section 64b is joined to the longitudinal wall 51b of the reinforcing member 51 by spot welding (three-layer welding) or the like.

<Closed Cross Section by Anchor Patch>

As shown in FIG. 13, the anchor patch 61 extends in the longitudinal direction across the protrusion 18 on the inner side in the lateral direction. One end (front) in the longitudinal direction of the anchor patch 61 is joined via the flange 63b to the protruding front wall 15 of the inner rear pillar 11 in the longitudinal direction by spot welding or the like.

In addition, the other end (rear) in the longitudinal direction of the anchor patch 61 is joined via the flange 63b to the rear inner wall 12 of the inner rear pillar 11 in the lateral direction by spot welding or the like.

Further, a rear edge 63b1 of the flange 63b is joined to the flange 42b of the outer rear panel 41 and the flange 16a of the inner rear pillar 11 by spot welding (three-layer welding) or the like.

The anchor patch 61 as described above and the inner rear pillar 11 define a closed cross section so as to surround inside the protrusion 18.

Note that, in FIG. 13, a reference numeral 13a denotes a hole formed in the protruding rear wall 13 so as to face a joint portion 20d between the flange 63a of the anchor patch 61 and the protruding front wall 15 of the inner rear pillar 11.

In the present embodiment, as shown by a hidden line (dotted line) in FIG. 12, the holes 13a are formed in line in the vertical direction of the protruding rear wall 13 of the inner rear pillar 11. In the present embodiment, the two holes 13a are formed, but one or more than two holes 13a may be formed.

Next, advantageous effects of the rear body structure 1 will be described.

In the rear body structure 1 of the present embodiment, the contact portion 20b between the protrusion 18 of the inner rear pillar 11 and the inner face of the outer rear pillar 31 is formed across the rear pillar 10 in the vertical direction.

According to the rear body structure 1, the contact portion 20b extending in the vertical direction increases the rigidity of the outer rear pillar 31 forming the design face of the car.

In addition, according to the rear body structure 1, since the protrusion 18 is continuously formed in the vertical direction, the rigidity caused by the cross-sectional shape is gained.

Further, the rear body structure 1 does not need a separate member to be arranged on the outer rear pillar 31 in order to increase the rigidity, which is different from the conventional rear body structure. Therefore, according to the present invention, a mounting mark due to the separate member does not affect the design face, which is different from the conventional rear body structure, and the design face of the rear pillar looks nice.

Furthermore, according to the rear body structure 1, the reduction in weight of the car is achieved, in addition to the reduction in the number of components, the manufacturing cost, the number of manufacturing steps and the like.

Moreover, in the rear body structure 1 of the present embodiment, the contact portion 20b is formed in the vicinity of the overlapped portion 20c between parts of the inner rear pillar 11 divided as an upper one and a lower one, that is, the lower inner rear pillar 11a and the middle inner rear pillar 11b.

According to the rear body structure 1, the strength of the contact portion 20b is increased.

Still further, in the rear body structure 1 of the present embodiment, the beads 23 are formed in the vicinity of the joint portion 20a between the inner rear pillar 11 and the inner rear panel 21.

According to the rear body structure 1, the rigidity of the inner rear pillar 11 is increased.

Still further, in the rear body structure 1 of the present embodiment, the inner rear pillar 11 has the extension 17 that extends toward the inner rear panel 21 to be connected to the inner rear panel 21.

According to the rear body structure 1, the rigidity of the entire inner rear pillar 11 is increased.

Still further, in the rear body structure 1 of the present embodiment, the beads 23 are formed separately from the extension 17 in the vertical direction along the rear pillar 10.

According to the rear body structure 1, the rigidity at each of the upper and lower ends of the inner rear pillar 11 is secured to increase the rigidity of the entire inner rear pillar 11.

Still further, in the rear body structure 1 of the present embodiment, the reinforcing member 51 is arranged along the corner portion 18a.

According to the rear body structure 1, the rigidity of the protrusion 18 is increased, and the rigidity of the outer rear pillar 31 forming the design face is further increased.

Still further, in the rear body structure 1 of the present embodiment, the reinforcing member 51 is continuously formed with the contact portion 20b in the vertical direction of the rear pillar 10.

According to the rear body structure 1, the rigidity of the inner rear pillar 11 is increased in the vertical direction.

Still further, in the rear body structure 1 of the present embodiment, the anchor patch 61 is joined to the inner rear pillar 11 across the protrusion 18 in the longitudinal direction, to define a closed cross section between the anchor patch 61 and the inner rear pillar 11. Additionally, one end in the longitudinal direction of the anchor patch 61 is joined to the inner rear pillar 11 in the longitudinal direction.

According to the rear body structure 1, the closed cross section is defined in the rear pillar 10 by the anchor patch 61 to increase the strength of the protrusion 18. Also, since the anchor patch 61 is joined to the inner rear pillar 11 in different directions which are the lateral direction and the longitudinal direction, the attachment strength of the anchor patch 61 to the inner rear pillar 11 is further increased.

The embodiment of the present invention have been described above, but the present invention is not limited to the above-described embodiment and can be implemented in various forms.

In the above embodiment, the beads 23 are formed in the inner rear panel 21, but may be formed in the inner rear pillar 11. Alternatively, the beads 23 may be formed in both the inner rear pillar 11 and the inner rear panel 21.

In addition, the beads 23 may be formed at the upper end of the inner rear pillar 11 and/or the inner rear panel 21. The extension 17 may also be provided at the lower end of the inner rear pillar 11 and/or the inner rear panel 21.

Further, in the above embodiment, the anchor patch 61 is joined to the inner rear pillar 11 in the longitudinal direction via the protruding front wall 15, but may be joined via the protruding rear wall 13. In this case, the holes 13a are formed in the protruding front wall 15.

In the rear body structure 1 according to the embodiment of the present invention, the protrusion 18 of the inner rear pillar 11 is joined to the roof member (outer roof panel 50 in the present embodiment) or the rear member (garter 70 in the present embodiment) in the corner C. Therefore, in the rear body structure 1, the strength of the corner C is improved with a simple configuration using the protrusion 18.

In the rear body structure 1, the inner rear pillar 11 is divided into the lower inner rear pillar 11a, the middle inner rear pillar 11b and the upper inner rear pillar 11c. Therefore, in the rear body structure 1, the degree of freedom in molding the upper inner rear pillar 11c is improved and a desired shape is obtained for joining to the roof member or the rear member.

In the rear body structure 1, the protrusion 18 of the inner rear pillar 11 is joined to the outer roof panel 50 as a roof member in the corner C. Therefore, in the rear body structure 1, the assembly accuracy of the outer roof panel 50 constituting the ceiling face (design face) of the vehicle is improved.

In the rear body structure 1, the protrusion 18 of the inner rear pillar 11 is joined to the extending portion (rear wall 50b) of the outer roof panel 50 in the corner C. Therefore, in the rear body structure 1, the protrusion 18 is easily joined to the outer roof panel 50.

In the rear body structure 1, the protrusion 18 of the inner rear pillar 11 is joined to the roof member (outer roof panel 50 in the present embodiment) and the rear member (garter 70 in the present embodiment) at the same joint portion 43 in the corner C. Therefore, in the rear body structure 1, the strength of the corner C is further improved by three-piece welding.

In the rear body structure 1, the degree of freedom in molding the rear portion of the vehicle is improved by the garter 70.

In the rear body structure 1, the protrusion 18 of the inner rear pillar 11 is joined to the side member (outer rear pillar 31) in the corner C. Therefore, in the rear body structure 1, the strength of the corner C is further improved.

In the rear body structure 1, the assembly accuracy of the outer rear pillar 31 constituting the side face (design face) of the vehicle is improved.

In the rear body structure 1 of the present embodiment, the anchor patch 61 is joined to the protruding front wall 15 in the longitudinal direction.

According to the rear body structure 1, the joint portion 20d of the anchor patch 61 receives a load in the shearing direction to the pulling load of the seat belt. Therefore, in the rear body structure 1, the strength to the load is sufficiently secured.

In the rear body structure 1 of the present embodiment, the holes 13a are formed in the protruding rear wall 13 so as to face the joint portion 20d of the anchor patch 61 in the longitudinal direction.

In the rear body structure 1, the joint portion 20d of the anchor patch 61 is formed in the closed cross section formed by the anchor patch 61 inside in the lateral direction of the protrusion 18. In the rear body structure 1, the joint portion 20d in the closed cross section is easily accessible by inserting the working tool through the holes 13a.

Further, in the rear body structure 1 of the present embodiment, the anchor patch 61 defines a closed cross section along with the inner rear pillar 11. Further, the anchor patch 61 is joined to the protruding front wall 15 in the longitudinal direction and is joined to the rear inner wall 12 in the lateral direction.

According to the rear body structure 1, the strength of the protrusion 18 is increased by the closed cross section. Further, since the anchor patch 61 is joined to the inner rear pillar 11 in different directions, that is, the lateral direction and the longitudinal direction, the attachment strength of the anchor patch 61 to the inner rear pillar 11 is further increased.

In the rear body structure 1 of the present embodiment, the anchor patch 61 has the extended portion 64 to be joined to the reinforcing member 51.

According to the rear body structure 1, the rigidity of the anchor patch 61 is increased.

In the rear body structure 1 of the present embodiment, the extended portion 64 of the anchor patch 61 has the support plate 64a to be joined to the lateral wall 51a of the reinforcing member 51, and the support section 64b to be joined to the longitudinal wall 51b of the reinforcing member 51.

According to the rear body structure 1, the joining strength of the anchor patch 61 is increased at the extended portion 64.

For example, the protrusion 18 may be joined to only one of the roof member and the rear member in the corner C. Further, the protrusion 18 may be joined to the roof member and the rear member at respective joining portions in the corner C. Still further, the roof member having the protrusion 18 joined thereto is not limited to the outer roof panel 50, and may be a roof panel inner (not shown) that forms a closed cross section along with the outer roof panel 50 on the front side face. In addition, the rear member having the protrusion 18 joined thereto is not limited to the garter 70, and may be the outer rear panel 41, or may be the inner rear panel 11 that forms a closed cross section on the horizontal plane along with the outer rear panel 41.

What is claimed is:

1. A rear body structure comprising:
    a rear pillar at a rear of a vehicle body,
        wherein the rear pillar includes an outer rear pillar that is arranged outside in a lateral direction to form an exterior face of the rear pillar and an inner rear pillar that is arranged inside of the outer rear pillar in the lateral direction,
        wherein the inner rear pillar has a protrusion that protrudes toward the outer rear pillar,
        the protrusion is continuously formed in a vertical direction of the rear pillar to include a first wall and a second wall which extend in the lateral direction to face to each other, and an outer wall to connect the first wall and the second wall,
        the protrusion extends from a top portion to a bottom portion of the rear pillar, and
        the outer wall includes a contact portion that contacts an inner face of the outer rear pillar in the vertical direction of the rear pillar.

2. The rear body structure according to claim 1,
    wherein the inner rear pillar is divided in the vertical direction of the rear pillar, and
    the contact portion is formed in a vicinity of an overlapped portion between parts of the inner rear pillar divided as an upper one and a lower one.

3. The rear body structure according to claim 1 further comprising an inner rear panel that is arranged inside in the lateral direction of the outer rear pillar and is connected to one end in a longitudinal direction of the inner rear pillar,
    wherein a bead is formed in at least one of the inner rear pillar and the inner rear panel in a vicinity of a joint portion between the inner rear pillar and the inner rear panel.

4. The rear body structure according to claim 1 further comprising an inner rear panel that is arranged inside in the lateral direction of the outer rear pillar and is connected to one end in a longitudinal direction of the inner rear pillar,
    wherein the inner rear pillar has an extension that extends toward the inner rear panel to be connected to the inner rear panel.

5. The rear body structure according to claim 4,
    wherein a bead is formed in at least one of the inner rear pillar and the inner rear panel in a vicinity of a joint portion between the inner rear pillar and the inner rear panel, and
    the bead is arranged separately from the extension in the vertical direction of the rear pillar.

6. The rear body structure according to claim 1,
    wherein the protrusion includes a corner portion on an inside in the lateral direction, and
    a reinforcing member is arranged along the corner portion.

7. The rear body structure according to claim 6,
    the reinforcing member is continuously formed with the contact portion in the vertical direction of the rear pillar.

8. The rear body structure according to claim 1, further comprising:
    an anchor patch of a seat belt, the anchor patch being arranged inside in the lateral direction of the inner rear pillar,
    wherein the anchor patch is joined to the inner rear pillar across the protrusion in the longitudinal direction to define a closed cross section between the anchor patch and the inner rear pillar, and
    one end in the longitudinal direction of the anchor patch is joined to the inner rear pillar in the longitudinal direction and the other end of the anchor patch is joined to the inner rear pillar in the lateral direction.

\* \* \* \* \*